(12) United States Patent
House et al.

(10) Patent No.: US 8,807,840 B2
(45) Date of Patent: Aug. 19, 2014

(54) INSULATING AND DAMPING SLEEVE FOR A ROLLING ELEMENT BEARING CARTRIDGE

(75) Inventors: Timothy House, Hendersonville, NC (US); Paul Diemer, Arden, NC (US); Allan Kelly, Hendersonville, NC (US); Augustine Cavagnaro, Flat Rock, NC (US)

(73) Assignee: BorgWarner Inc., Auburn Hills, MI (US)

( * ) Notice: Subject to any disclaimer, the term of this patent is extended or adjusted under 35 U.S.C. 154(b) by 127 days.

(21) Appl. No.: 13/264,761

(22) PCT Filed: Apr. 16, 2010

(86) PCT No.: PCT/US2010/031338
§ 371 (c)(1),
(2), (4) Date: Oct. 17, 2011

(87) PCT Pub. No.: WO2010/123764
PCT Pub. Date: Oct. 28, 2010

(65) Prior Publication Data
US 2012/0033908 A1 Feb. 9, 2012

Related U.S. Application Data

(60) Provisional application No. 61/170,818, filed on Apr. 20, 2009.

(51) Int. Cl.
*F16C 19/50* (2006.01)
*F16C 33/32* (2006.01)
*F16C 33/60* (2006.01)
*F04B 17/00* (2006.01)

(52) U.S. Cl.
USPC ............ 384/476; 384/492; 384/504; 417/407

(58) Field of Classification Search
CPC ............ F16C 19/02; F16C 19/08; F16C 9/18; F16C 9/182; F16C 9/183; F16C 19/22; F16C 19/34; F16C 19/38; F16C 35/06; F16C 35/061; F16C 35/067; F16C 35/07; F16C 35/073; F16C 35/077
USPC ................. 384/499–504, 519, 520, 476, 492; 417/406, 407
See application file for complete search history.

(56) References Cited

U.S. PATENT DOCUMENTS 3,447,846 A * 6/1969 Marsh ............................ 384/536
3,986,754 A * 10/1976 Torrant .......................... 384/504

(Continued)

FOREIGN PATENT DOCUMENTS

DE 102004023280 A1 12/2005
EP 0376092 B1 7/1990

(Continued)

*Primary Examiner* — Alan B Waits
(74) *Attorney, Agent, or Firm* — Miller Canfield (57) ABSTRACT

A turbocharger uses a high speed rolling element bearing system. An exemplary rolling element bearing system includes a polymer sleeve to impede the flow of heat from the bearing housing into the outer race of the rolling element bearing system. In a second embodiment of the invention, the sleeve is supported by an oil film. In a third embodiment of the invention, the bearing cartridge is damped by a damping medium which also connects the bearing cartridge to the bearing housing.

10 Claims, 11 Drawing Sheets

(56) References Cited

U.S. PATENT DOCUMENTS

| | | | |
|---|---|---|---|
| 4,721,441 A * | 1/1988 | Miyashita et al. | 417/407 |
| 5,073,085 A | 12/1991 | Ito et al. | |
| 5,522,667 A * | 6/1996 | Miyake | 384/492 |
| 5,868,503 A * | 2/1999 | Bade | 384/536 |
| 6,163,441 A * | 12/2000 | Wood et al. | 360/266.1 |
| 6,322,254 B1 * | 11/2001 | Schwinghammer et al. | 384/537 |
| 6,443,696 B1 | 9/2002 | Erdmann et al. | |
| 2007/0036477 A1 * | 2/2007 | McKeirnan | 384/517 |
| 2007/0183704 A1 * | 8/2007 | Umekawa | 384/517 |
| 2008/0019629 A1 * | 1/2008 | McKeirnan | 384/493 |

FOREIGN PATENT DOCUMENTS

| | | | | |
|---|---|---|---|---|
| JP | 55101163 A * | 8/1980 | | G11B 21/08 |
| JP | 55112421 A * | 8/1980 | | F16C 35/077 |
| JP | 2005-172098 A | 6/2005 | | |

* cited by examiner

INSULATING AND DAMPING SLEEVE FOR A ROLLING ELEMENT BEARING CARTRIDGE

FIELD OF THE INVENTION

This invention is directed to the design of an insulating sleeve for a turbocharger rolling element bearing cartridge. The assembly is designed to inhibit the flow of heat from the bearing housing to the bearings, and to damp the vibrations, common with turbochargers, from influencing the bearings.

BACKGROUND OF THE INVENTION

Turbochargers deliver air, at greater density than would be possible in the normally aspirated configuration, to the engine intake, allowing more fuel to be combusted, thus boosting the engine's horsepower without significantly increasing engine weight. This can enable the use of a smaller turbocharged engine, replacing a normally aspirated engine of a larger physical size, thus reducing the mass and aerodynamic frontal area of the vehicle.

Turbochargers are a type of forced induction system which use the exhaust flow, entering the turbine housing from the engine exhaust manifold, to drive a turbine wheel (51), which is located in the turbine housing. The turbine wheel is solidly affixed to a shaft to become the shaft and wheel assembly, the other end of which assembly contains a compressor wheel (20) which is mounted to the stub shaft (56) end of the shaft and wheel and held in position by the clamp load from a compressor nut (29). The primary function of the turbine wheel is providing rotational power to drive the compressor.

The compressor stage consists of a wheel (20) and it's housing. Filtered air is drawn axially into the inlet of the compressor cover by the rotation of the compressor wheel. The power generated by the turbine stage to the shaft and wheel drives the compressor wheel to produce a combination of static pressure with some residual kinetic energy and heat. The pressurized gas exits the compressor cover through the compressor discharge and is delivered, usually via an intercooler, to the engine intake.

In one aspect of compressor stage performance, the efficiency of the compressor stage is influenced by the clearances between the compressor wheel contour (28) and the matching contour in the compressor cover. The closer the compressor wheel contour is to the compressor cover contour, the higher the efficiency of the stage. The closer the wheel is to the cover, the higher the chance of a compressor wheel rub; so there has to exist a compromise between improving efficiency and improving durability.

The wheel in the compressor stage of a typical turbocharger does not rotate about the geometric axis of the turbocharger, but rather describes orbits roughly about the geometric center of the turbocharger. The geometric center referred to here is the geometric axis (100) FIG. 1, of the turbocharger.

The dynamic excursions taken by the shaft are attributed to a number of factors including: the unbalance of the rotating assembly, the excitation of the pedestal (i.e., the engine and exhaust manifold), and the low speed excitation from the vehicle's interface with the ground.

The net effect of these excursions taken by the wheels is that the design of the typical turbocharger has clearances far greater than those desired for aerodynamic efficiency levels.

The typical turbocharger is fed with oil from the engine. This oil, at a pressure, typically equal to that of the engine, performs several functions. The oil is delivered to both sides of the journal bearings (30), via oil galleries (82 and 83) to provide a double hydrodynamic squeeze film, the pressures of which exert reactionary forces of the shaft on the ID of the bearing and of the OD of the bearing on the bearing housing bore. The oil films provide attenuation of the reactionary forces to reduce the amplitude of the excursions of the shaft. The oil also functions to remove heat from the turbocharger as the oil drains through the oil drain (85) to the crankcase of the engine.

A typical turbocharger design has two adjacent bearing systems: one on the compressor-end of the bearing housing, and one on the turbine-end of the bearing housing. Each system has two interfaces: the interface of the rotating shaft on the I.D. of the floating bearing, and the interface of the O.D. of the floating bearing on the fixed bore of the bearing housing.

The stiffness and damping capacities of the typical turbocharger double hydrodynamic squeeze film bearings are a compromise between the thickness of the film generated by the rotational speed of the bearing elements, the clearance between said elements, and the oil flow limitations due to the propensity of turbochargers to pass oil through the piston ring seals at either end of the shaft.

The use of REBs in a turbocharger solves several problems, including: high oil flow rates, bearing damping, and power losses through the bearing system.

Figure 1:
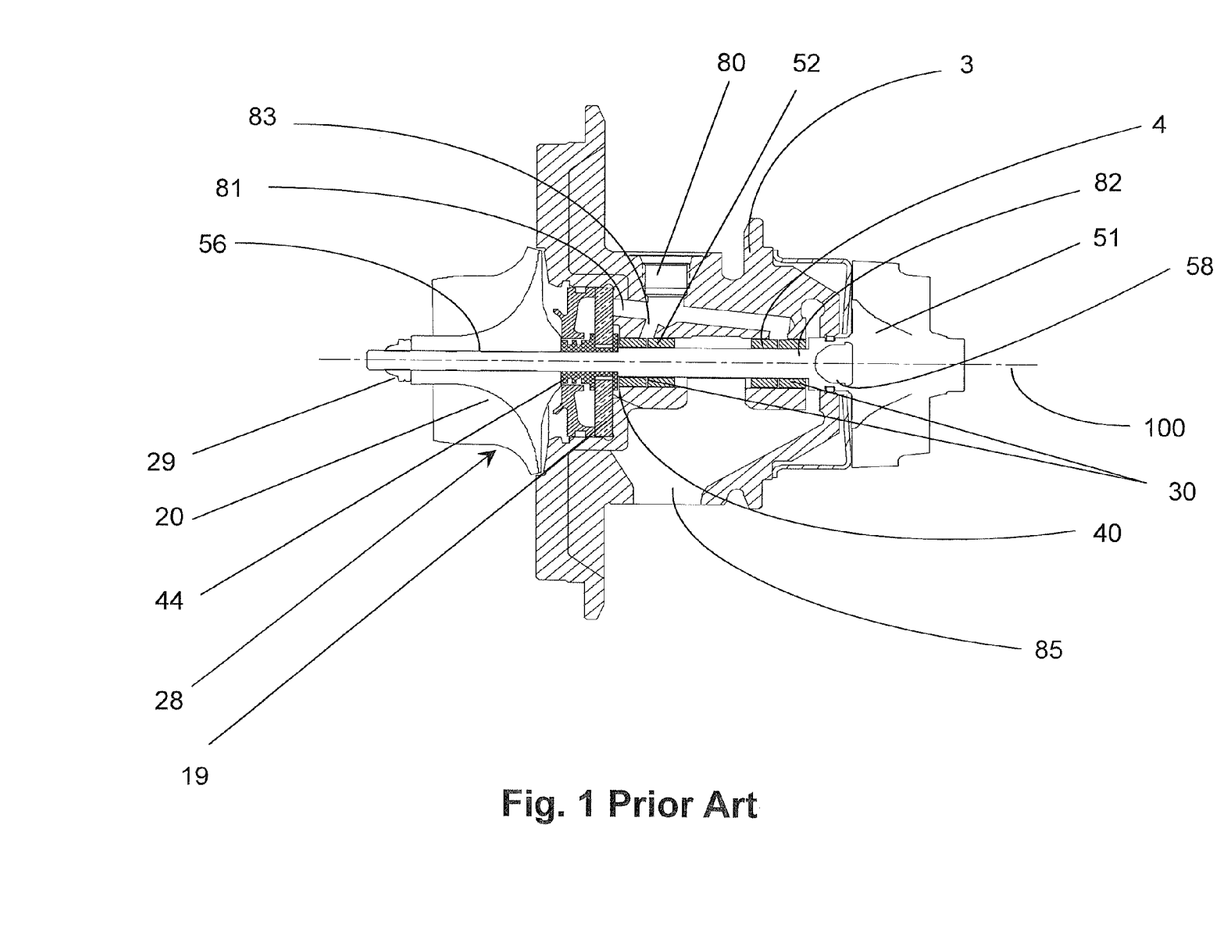
FIG. 1 depicts a section of a turbocharger assembly.
Figure 2:
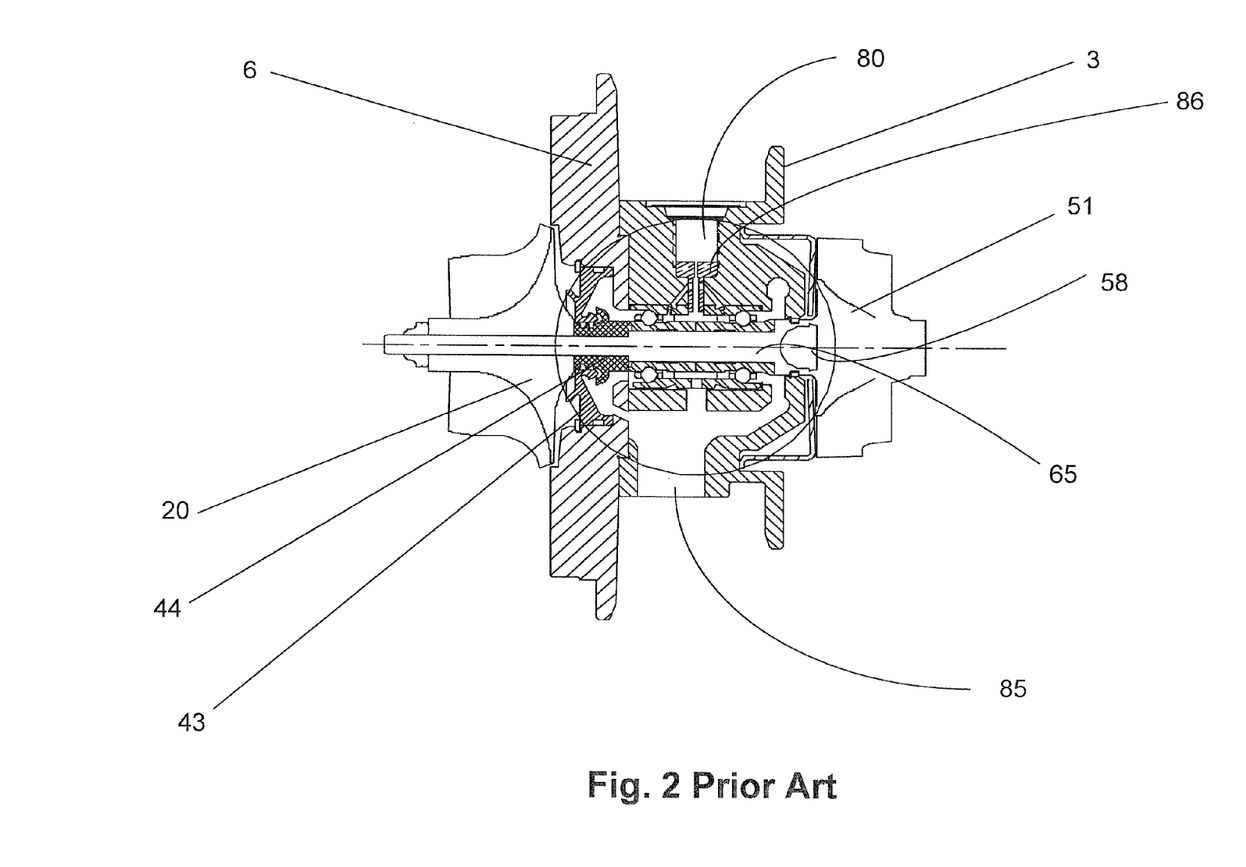
FIG. 2 depicts a section of a typical ball bearing turbocharger bearing housing assembly.
Figure 3:
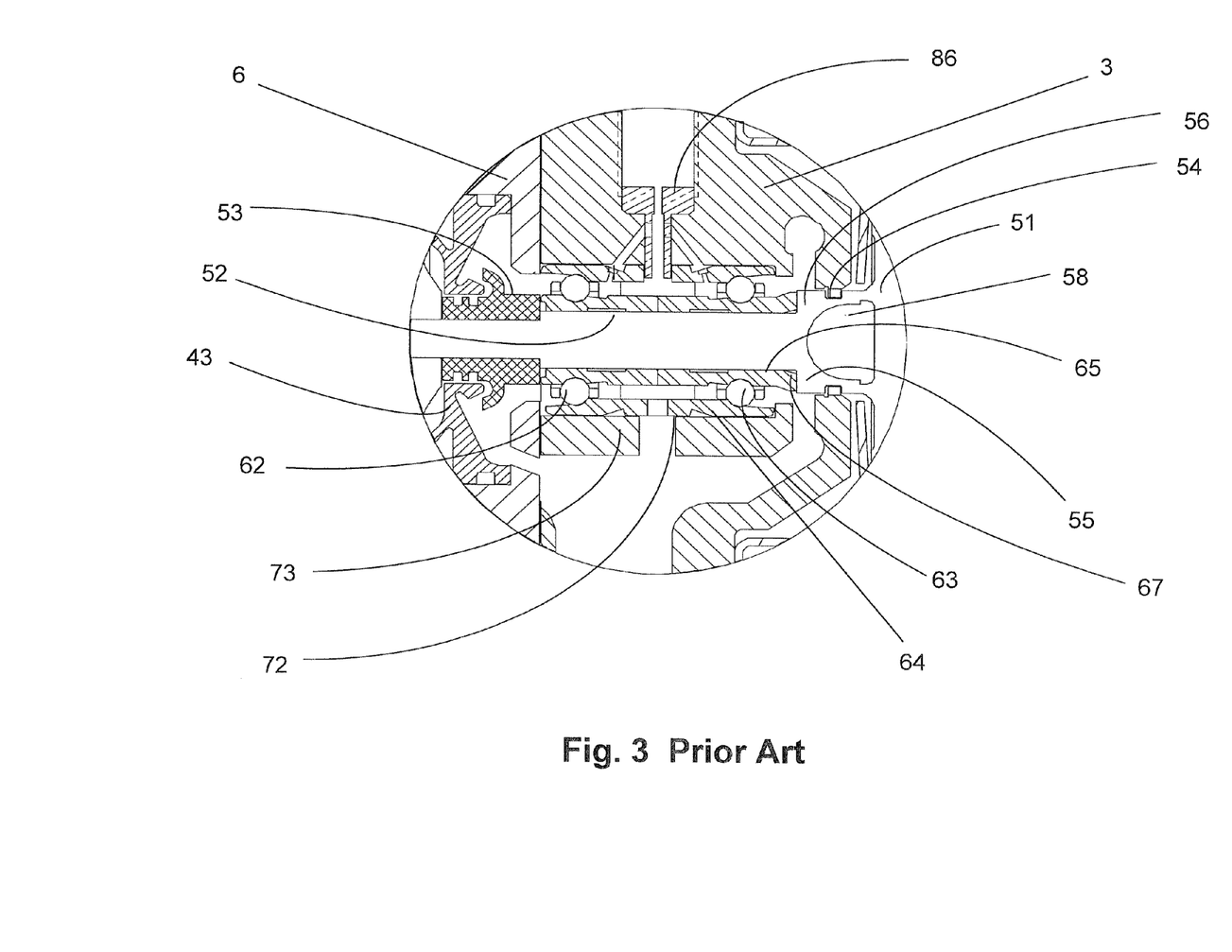
FIG. 3 depicts a magnified view of FIG. 2.
Figure 4:
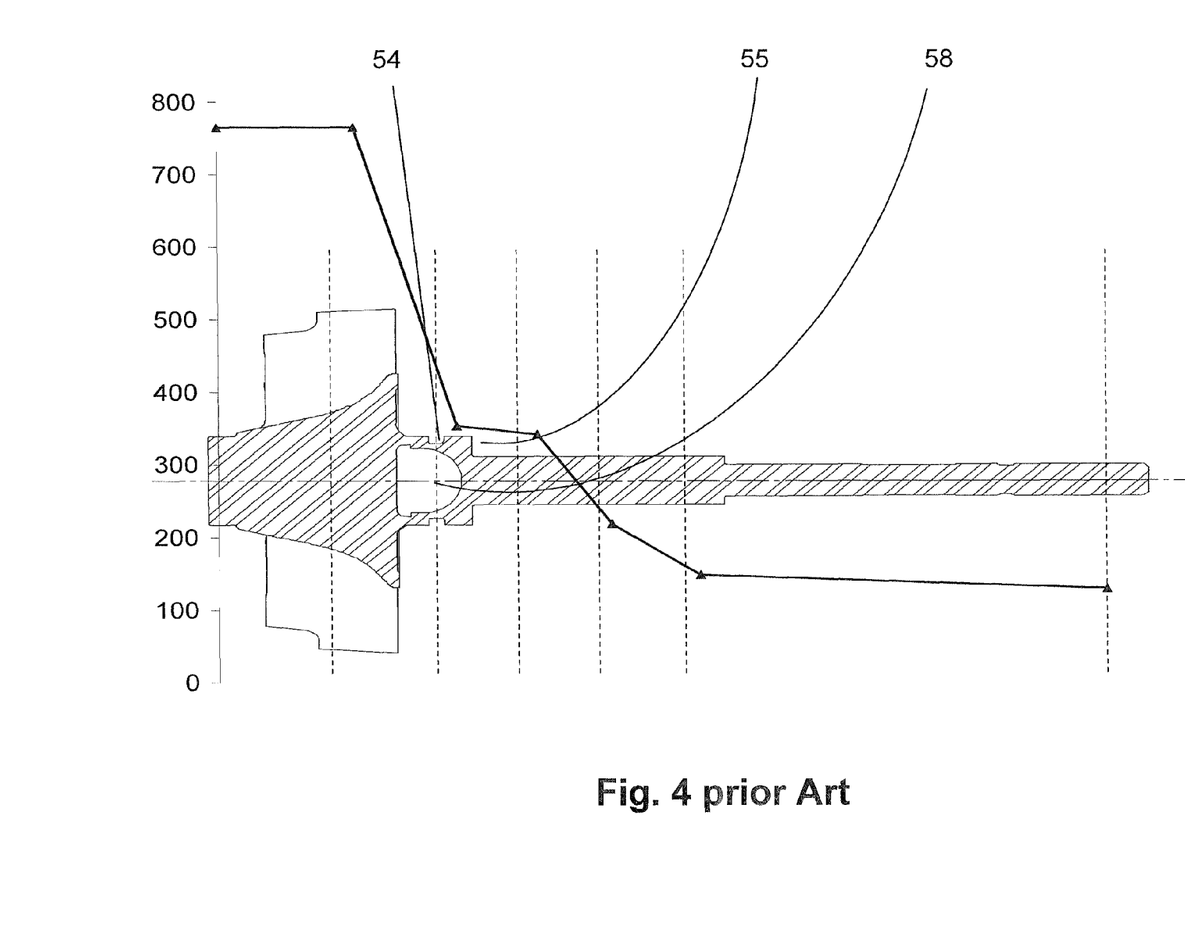
FIG. 4 depicts a shaft and wheel section overlaid with the temperature.

FIG. 1 depicts a typical turbocharger double hydrodynamic squeeze film bearings configuration. In this configuration, pressure fed oil is received by the bearing housing (3) though an oil inlet (80) from the engine. The oil is pressure fed through the oil galleries (82 and 83) to the bearing housing and journal bearing bore (4). For both the turbine-end and compressor-end bearings, the oil flow is delivered to the shaft and wheel journal bearing zones at which points the oil is distributed around the shaft to generate an oil film between the shaft surface (52) and the inner bore of the floating journal bearings (30). On the outside of the journal bearings (30), a like oil film is generated by the rotation of the journal bearing against the bearing housing journal bearing bore (4).

In the typical turbocharger depicted in FIG. 1, the thrust bearing (19) is also a hydrodynamic or fluid film type of bearing. In this configuration, the stationary thrust bearing is fed oil from the oil gallery (81) to feed a ramp and pad design of bearing. The oil is driven into a wedge shape by the relative motion of the thrust washer (40) and the thrust washer area of the flinger (44), which is mounted to the shaft, against the static thrust ramp and pad. This bearing controls the axial position of the rotating assembly.

For the typical 76 mm turbine wheel-sized turbocharger discussed above, the oil flow is in the region of 4200 to 6200 grams per minute.

One method of increasing the efficiency of the turbocharger has been the adoption of ball bearings to support the rotating assembly. There are several improvements that come with the adoption of rolling element bearing turbochargers. There is an improvement in transient response due to the reduction in power losses, especially at low turbocharger RPM, of the REB system over the typical turbocharger bearing system. The power losses in REB systems are less than those for typical sleeve type turbocharger bearing systems, and improved transient response (both being critical aspects of engine-out emissions). REB systems can support much greater thrust loads than can typical turbocharger bearing systems making the thrust component more robust. Since typical ramp and pad thrust bearings require a large percentage of the oil flow delivered to the turbocharger, and REB systems require less oil flow (than a typical turbocharger bearing system), then less oil flow is required for a REB system with the positive consequence that there is less propensity for oil passage to the compressor or turbine stages where that oil can poison the catalyst.

While ball bearing systems provide these efficiency and transient performance gains, the damping capacity of ball bearings is not as good as that of the typical turbocharger double hydrodynamic squeeze film bearings, so the ball bearings are retained in a steel cartridge, which is suspended within the bearing housing by an oil film between the O.D. of the cartridge and the I.D. of the bearing housing bore. The oil is used for damping of shaft critical events and for lubrication of the bearings.

U.S. Pat. No. 5,145,334 (Gutknecht) and U.S. Pat. No. 7,214,037 (Mavrosakis) teach methods for the retention of said bearing cartridge in the bearing housing. These methods allow for a floating bearing cartridge for which the axial and rotational forces are reacted upon by a post secured in the bearing housing while allowing for otherwise unconstrained motion of the bearing cartridge in the bearing housing.

For a turbocharger bearing system, achieving the required speed is a critical factor. Achieving that speed with an acceptable life for the system is the next most important factor. In any turbocharger, for meeting emissions requirements in the engine to which the turbocharger is applied, reducing the oil flow to the turbocharger and, by leakage, out of the turbocharger, is a major factor. Oil passage from the turbocharger through the piston ring seals is a major factor in the soluble organic fractions (SOF) component of particulate matter emissions. The only methods for reducing the oil passage through turbocharger piston ring seals is to either control the pressure differential across the seals (so that air does not flow from the turbocharger bearing housing to either the compressor or to the turbine stages), to control the barrier to this oil laden airflow through the seals, or to limit the quantity of oil in the turbocharger. The latter method is very effective and is one method which makes the use of REB turbochargers popular since the mean oil flow through the typical REB turbocharger example above is approximately 1400 grams/minute. By contrast, the mean oil flow through the same size sleeve bearing turbocharger is 3000 grams/minute or 218% more.

In high speed ball bearing development, much work has been done to improve the speed and life of the bearing system, especially in the area of the relationship between bearing power losses and oil flow. In NASA 2001-210462, the writers teach that: conventional jet lubrication fails to adequately cool and lubricate the inner race contact because lubricant is thrown centrifugally outward, and while increasing the flow rate results in carrying away more heat, it also adds to the heat generated from oil churning. The writers also note that bearing power loss is a direct function of oil flow to the bearing. Bearing life is an inverse function of temperature, the difference in temperature between the individual bearing ring components, and the resultant elastohydrodynamic film thickness.

Figure 5:
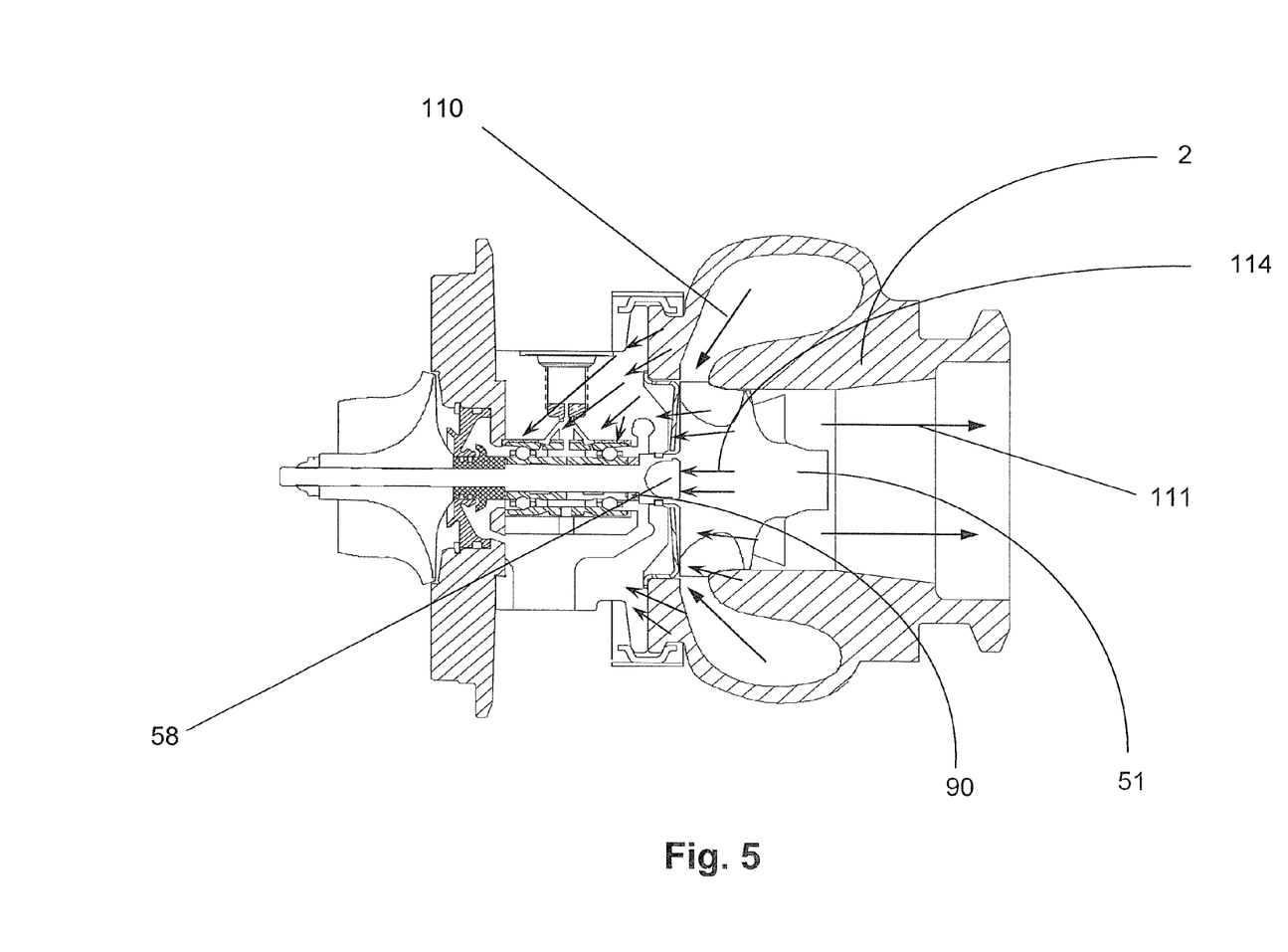
FIG. 5 depicts the heat flows through REB turbochargers.
Figure 6:
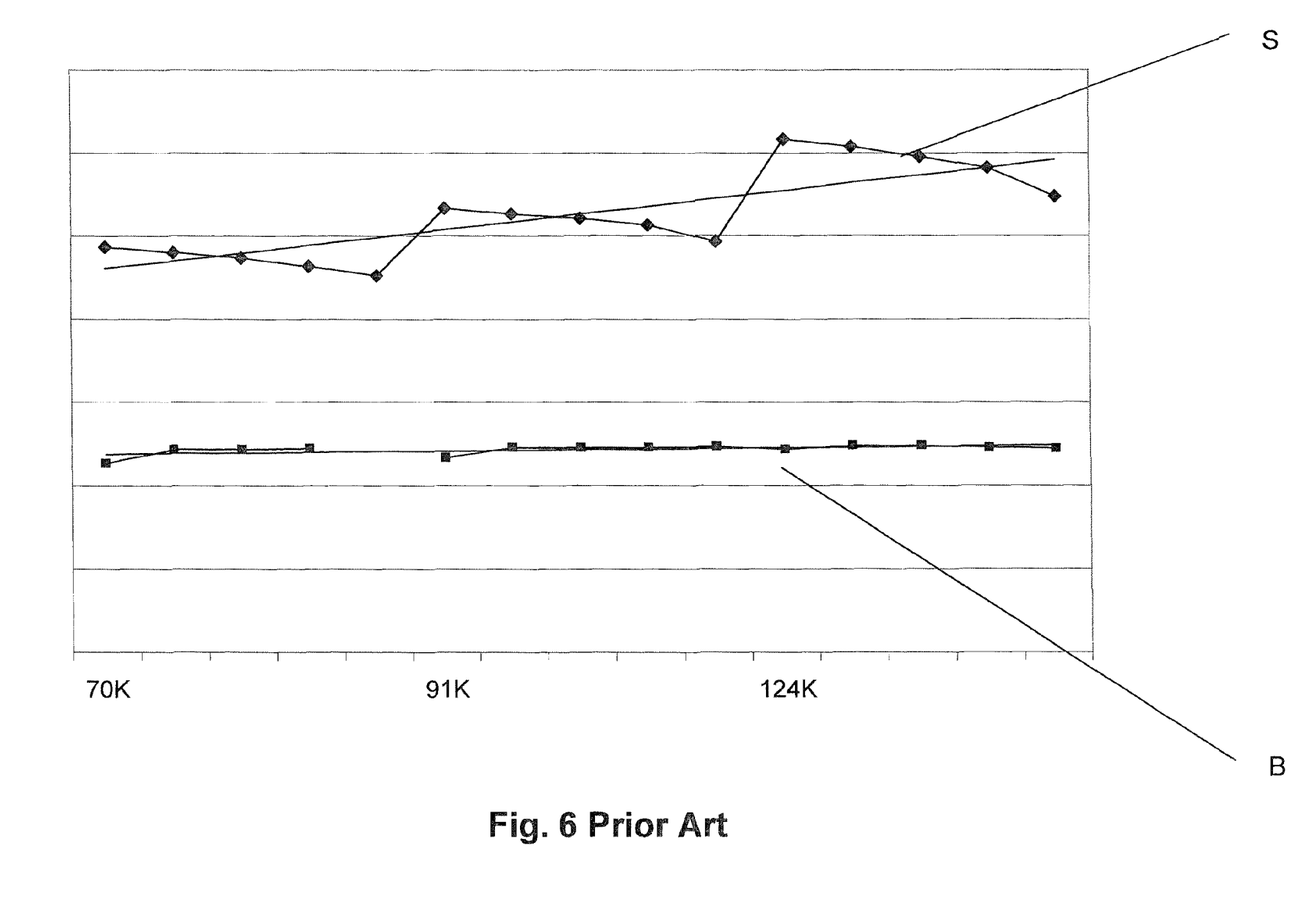
FIG. 6 depicts a comparison of oil flows through REB, and sleeve bearing turbochargers.

FIG. 5 depicts the flow of heat from the turbine housing, through the bearing housing, to the bearings. The exhaust flow from the engine flows into the turbine housing foot and through the volute. The flow (110) is directed by the volute at the turbine wheel (51) where most of the heat energy is transformed into torque to drive the turbine wheel. The remaining heat energy is left in the exhaust flow (111) out of the turbine housing, and in the turbine wheel and the turbine housing material. Some of the heat energy flows up the shaft, where it encounters the air dam (58), which acts as a thermal block to some of the heat flow up the shaft. Some of the heat energy from the turbine housing is conducted through the joint between the turbine housing and the bearing housing. Some of the heat energy is radiated to the atmosphere.

The heat flow from the turbine housing to the bearing housing (3) is transmitted by conduction to the bearing cartridge of a REB turbocharger. In sleeve bearing turbochargers, the lubricating oil for the bearings carries a great deal of this heat out of the turbocharger to the engine oil heat rejection system. In REB turbochargers, since the oil flow is less than half that of a sleeve bearing turbocharger, the capability of heat rejection by the oil is far less.

With maximum speed and reduced oil flow as given requirements, that leaves only temperature as a variable in the turbocharger lifetime calculation.

Temperature limitations on ball bearings are expressed as the incoming temperature to the bearing races, the heat energy generated by the bearing races as a function of the work done by the bearing, and the heat rejection from the bearing assembly. In the case of a turbocharger, there is heat input to the inner race through the shaft and wheel and heat input from the bearing housing to the cartridge and to the outer race. The output of heat from the turbocharger is via the lubricating oil to the lower part of the bearing housing, and then to the engine oil drain system, where it becomes part of the vehicle heat rejection system.

One expensive and relatively complicated method for control of heat input to the bearing system is the use of water-cooled bearing systems. These bearing housings use the engine coolant to draw heat from the bearing housing to the engine coolant system. The castings for these water-cooled bearing housings are multi-cored, so as to leave voids through which the engine coolant flows to pull heat from the exhaust flow. This makes the castings expensive since the number of cores is much higher than those for air-cooled turbine housings. The complexity of the multiple coring add time and cost to the production of the casting, and because they draw heat out of the turbine housing, via the bearing housing, the total heat energy available to the turbine wheel is reduced. Water-cooled bearing housings do, however, provide one very important function, and that is that they prevent heat soak problems after engine shut down when the heat from the engine, exhaust manifold, and turbine housing flows back into the turbocharger. These heat soak problems can force the bearings into metal to metal contact, with the potential for yield in the components, through the result of different coefficients of expansion and tolerances of the internal components.

So it can be seen that the temperature of the inner and outer ball races is critical to bearing life. The heat soak problems for turbocharger REBs are exacerbated over those for sleeve type bearings. There is always a need with REB turbochargers to achieve the desired speed and life at the lowest cost.

SUMMARY OF THE INVENTION

The present invention relates to the replacement of the typical rolling element outer oil film by an insulating sleeve of low thermal conductivity and good vibration damping properties to a turbocharger rolling element bearing assembly to inhibit the flow of heat from the bearing housing to the bearings, and to damp the vibrations, common with turbochargers, from influencing the bearings.

BRIEF DESCRIPTION OF THE DRAWINGS

The present invention is illustrated by way of example and not limitation in the accompanying drawings in which like reference numbers indicate similar parts and in which.

DETAILED DESCRIPTION OF THE INVENTION

Figure 7:
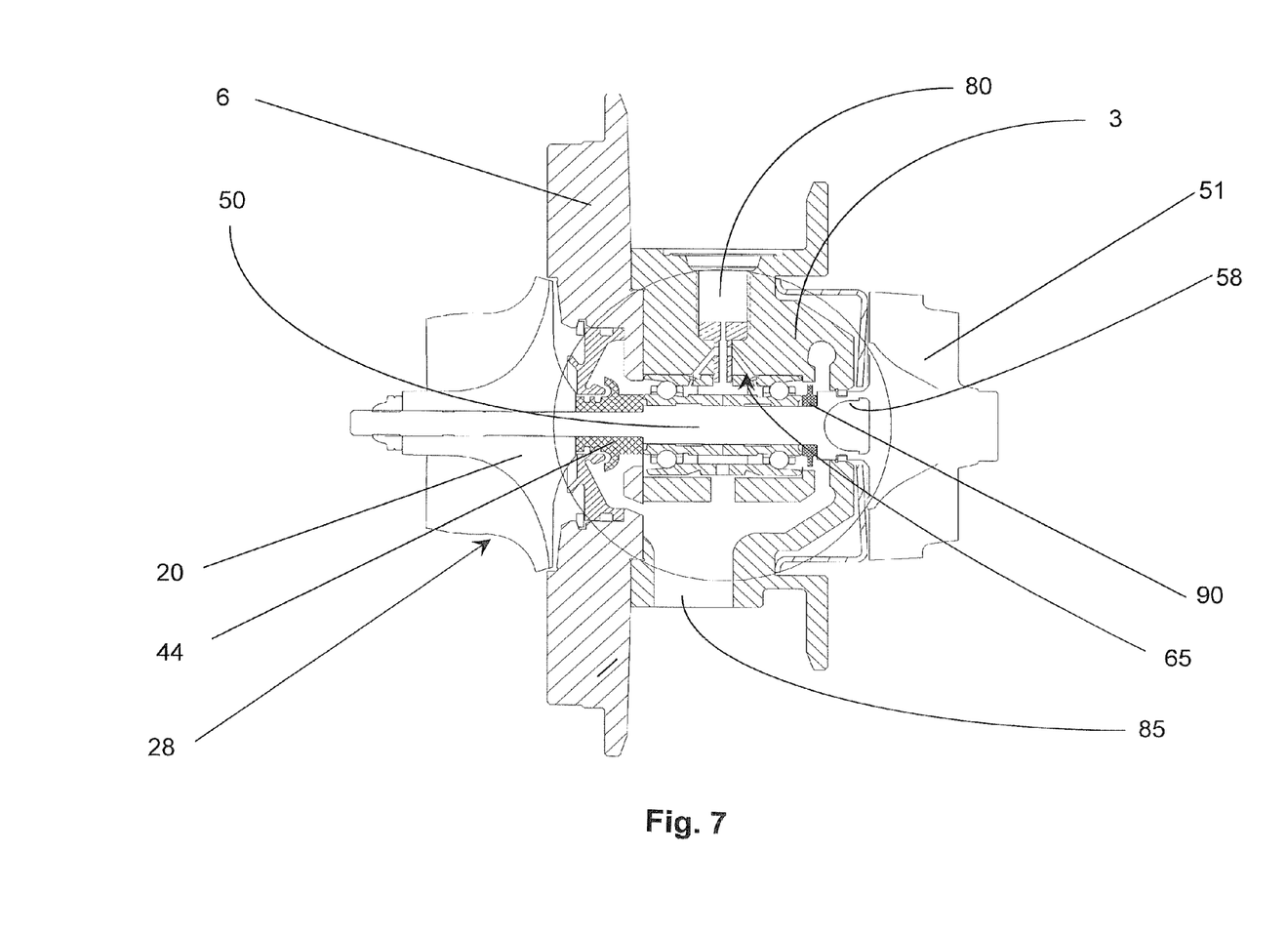
FIG. 7 depicts the first embodiment of the invention.
Figure 8:
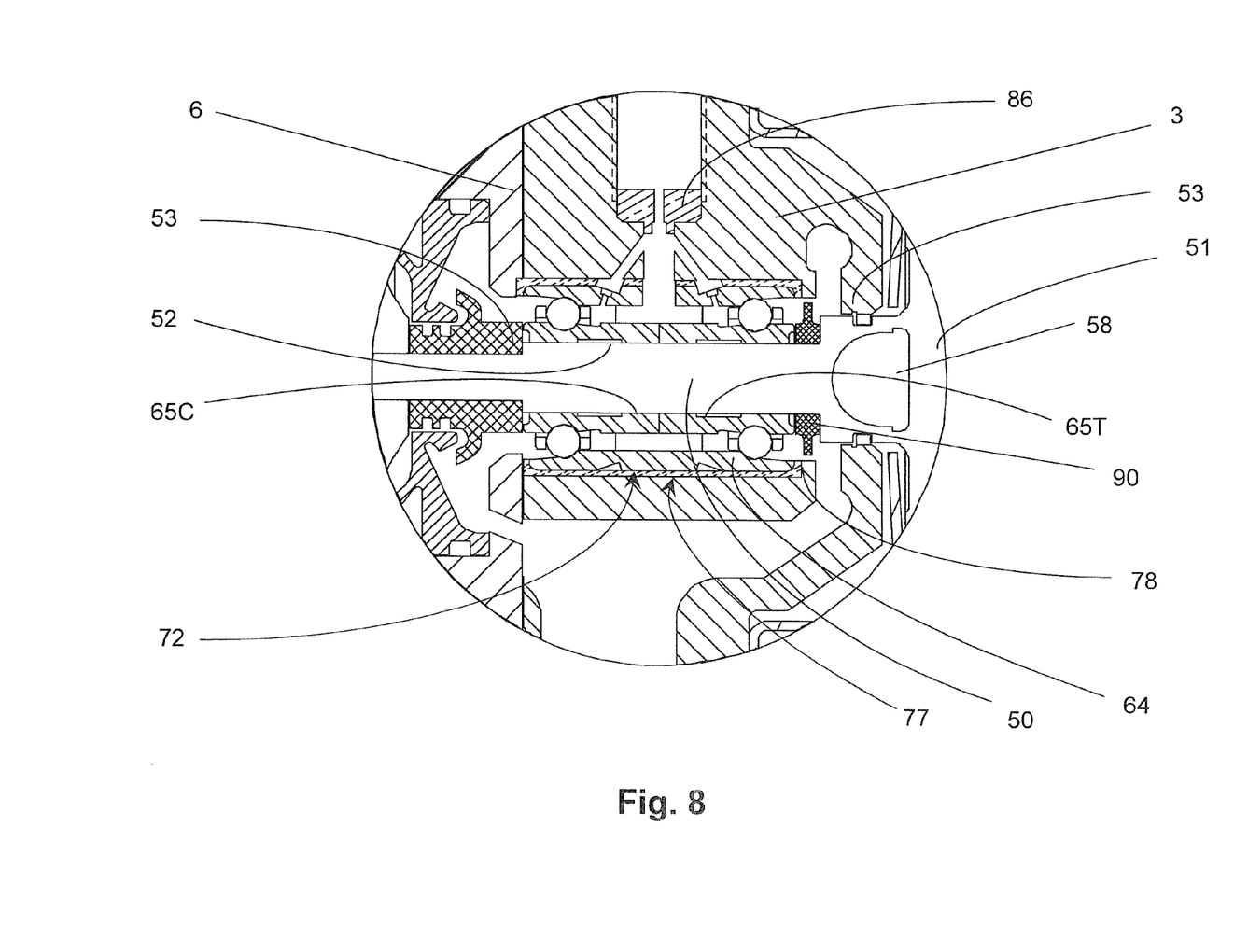
FIG. 8 depicts a magnified view of FIG. 7.

The inventors realized that the temperature of the inner races (65C and 65T) of a rolling element bearing assembly (REB) was a critical determining factor in both the bearing system attaining the desired speed and in it attaining appropriate life. Once that problem was resolved by inserting a spacer (90) of low thermal conductance, as can be seen in FIGS. 7 and 8, the next issue was to reduce the heat flow through the bearing housing to the bearing outer race.

By using a thermoplastic sleeve as a thermal block, the heat flow from the bearing housing to the bearing cartridge is reduced. The thermoplastic sleeve is also used to dampen the output critical speed resonant vibrations of the rotating assembly on the bearing housing in addition to the normal thrust loads generated by turbocharger events. Some of the input excitations derived from engine pedestal, road, and braking events are also damped by said sleeve.

Some REB systems use a cartridge to retain the bearing system, while some use the outer race as the cartridge. For the purpose of clarity, it is assumed that the cartridge mentioned herein can be either configuration.

In the exemplary embodiment of the invention, the encapsulating sleeve (77) is a durable, low thermal conductivity, chemical resistant, high-temperature resistant, non-metallic, low-friction engineering plastic. It could be, for example, (1) a polyetheretherketone (PEEK) such as KETRON PEEK 1000 or KETRON PEEK GF30, (2) a polytetrafluoroethylene compound such as that produced by Dupont and sold under the trademark TEFLON, (3) a polimide material such as that produced by Dupont and sold under the trademark VESPEL, (4) an acetal compound such as that produced by Dupont and sold under the trademark DELRIN, (5) an amorphous thermoplastic polyetherimide material such as that produced by General Electric and sold under the trademark ULTEM, (6) a polyamide-imide material such as that produced by Amoco and sold under the trademark TORLON, (7) a polybenzamidazole material such as that produced by Hoechst and sold under the trademark CELAZOLE, (8) a composite such as that produced through the chemical vapor in Miks et al U.S. Pat. No. 5,645,219 assigned on its face to Thiokol Corp. of Ogden, Utah and incorporated herein by reference in its entirety, or (9) other high strength polymers.

In FIGS. 7 and 8, the encapsulating sleeve (77) captures the bearing cartridge outer race (64) and provides radial location for the bearing cartridge in the bearing housing. This location sets the axial and radial positions of the turbine-end inner race (65T) and the compressor-end inner race (65C), which sets and controls the position of the turbine (51) and compressor (20) wheels, relative to their housings. In addition to this location feature, the encapsulating sleeve also provides a thermal barrier for heat flow from the bearing housing to the outer race. The thermal conductivity of polyimide resins such as VESPEL is in the range of 0.29 to 0.35 J/Kg-° C. The thermal conductivity of typical turbocharger materials, such as cast iron, with a thermal conductivity of 33 J/Kg-° C. and steel, with a thermal conductivity of 46 J/Kg-° C., are factors of 100 times greater; so it can be seen that these polyimide materials provide excellent resistance to heat flow.

The encapsulating sleeve (77) has an inside diameter (79) which is a mechanically or chemically affixed to the outer surface (72) of the REB cartridge, or outer bearing race.

Figures 9A, 9B:
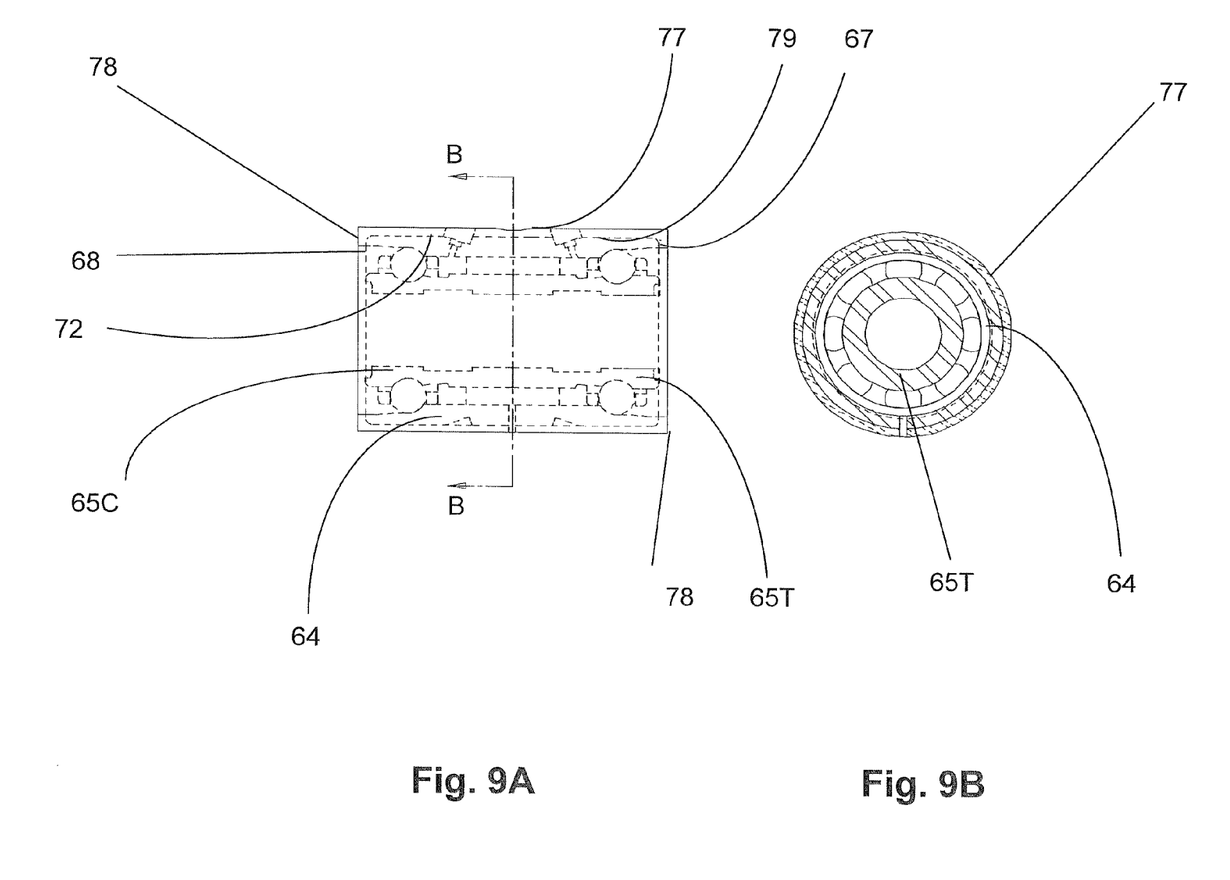
FIGS. 9A, 9B depict two views of the first embodiment of the invention.

While the encapsulating sleeve can be the same length as the bearing capsule, in the exemplary embodiment of the invention, the encapsulating sleeve also covers the end of the cartridge, or outer race (64), depending upon the configuration. In FIGS. 9A and 9B, the encapsulating sleeve has two ends (78), which provide thermal restriction to the heat flow, which could enter the outer race (64) from its axial ends (67 and 68).

Figure 10:
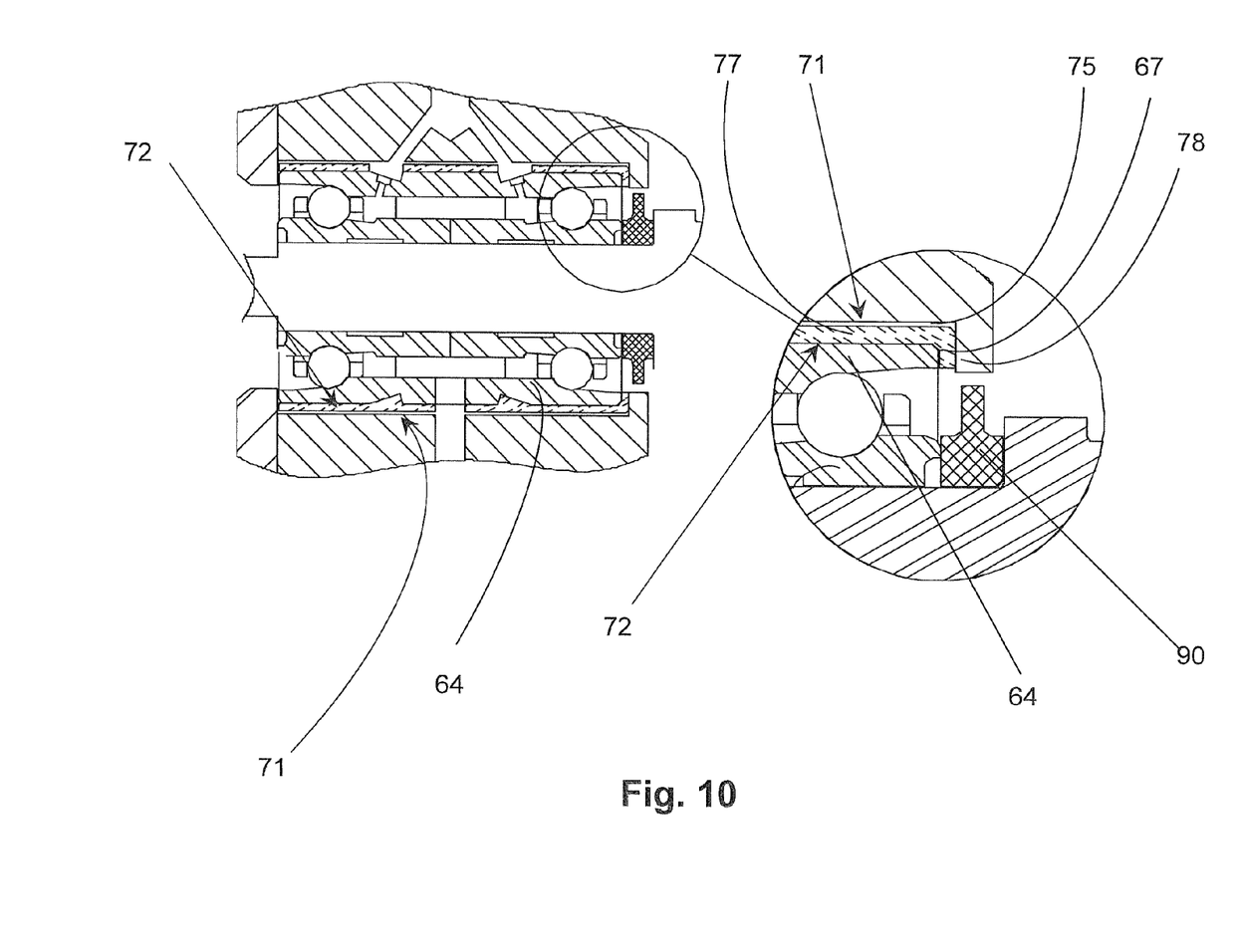
FIG. 10 depicts a section views of the second embodiment of the invention with a magnified view.

In the second embodiment of the invention, as depicted in FIGS. 10A and 10B, the encapsulating sleeve (77) serves only as a thermal block. The assembly of the bearing cartridge, or outer race (64), and the encapsulating sleeve (77) are supported and damped by an oil film (75) between the encapsulating sleeve (77) and the bearing housing inner bore (71).

Figure 11:
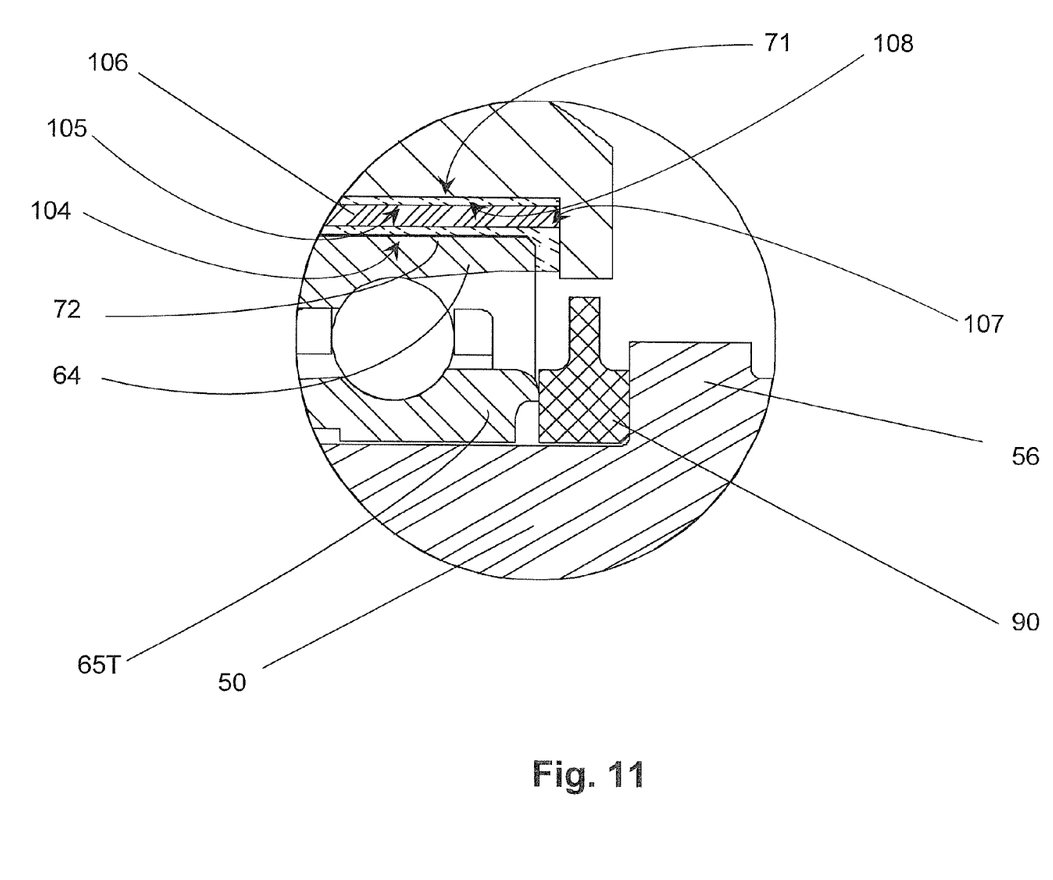
FIG. 11 depicts a magnified section view of the third embodiment of the invention.

In the third embodiment of the invention, the bearing cartridge, or outer race (64), is partially encapsulated by a composite sleeve assembly, which contains a visco-elastic damping medium (106) surrounding the bearing cartridge. One function of the visco-elastic medium is to attenuate vibration emitted by the bearing system in order to prevent harmful resonances from destroying the bearings. Another function of the visco-elastic medium is to attenuate and isolate engine and vehicle vibration in order to prevent those vibrations from upsetting the bearing system.

The inner sleeve has a substantially cylindrical inner diameter (104) which encompasses the outer surface (72) of bearing cartridge, or outer race (64), of the REB. The outer surface (105) of the inner sleeve is chemically or mechanically attached to the damping medium (106). The composite sleeve contains a damping medium (106), which is used to attenuate vibration, in and out of the REB. The inner surface (107) of the outer sleeve is likewise attached to the damping medium (106). The substantially cylindrical outer surface (108) of the outer sleeve mounts the assembly to a substantially cylindrical inner surface (71) of the bearing housing. The damping medium can be a visco-elastic material, such as Vamac, or Viton, or other visco-elastic materials capable of withstanding automotive liquids and temperature.

As in the other embodiments discussed above, the heat flow from the turbine wheel (51) travels around the air dam (58) to the piston ring boss (56) where a thermal spacer (90) inhibits the flow of heat to the inner race (65T) and the shaft (50).

The joint of the damping medium (106) to the inner or outer sleeve can be mold-bonded or post-bonded to the respective inner or outer sleeve in the manner in which elements of typical engine torsional crankshaft dampers are bonded together.

In the above embodiments the sleeve can cover the cartridge radially, or cover both radial and axial parts of the cartridge (i.e., turbine axial end and compressor axial end of the outer bearing race). In each of the embodiments, a thermal spacer (90) of low thermal conductance can be provided on the shaft between the turbine wheel and the cassette. The sleeve could be molded onto the cartridge, or it could be "clipped" onto the cartridge in the way that two halves could be clipped together, or the sleeve could be pressed onto the cartridge.

The surface (104) of the inner diameter of the inside sleeve is preferably mechanically or chemically attached to the outside surface (72) of the bearing cartridge, or outer race (64). The damping medium (106) has to be likewise attached to both the inner surface (107), of the outer sleeve, and outer surface (105) of the inner sleeve. The outside surface (108) of the outside layer has to mechanically (or chemically) attach to the inner bore (71) of the bearing housing. This interface could for example be hexagonal, it could be pressed in as a cylindrical shape. Ideally the assembly of the bearing-damping parts would be pressed in and held mechanically as the assembly has to handle the axial thrust loads of the turbocharger. To work effectively as a damper it has to be in mechanical contact so that the vibrational energy to be attenuated by the damping medium is actually transmitted to the damping medium.

For these reasons it is preferred that the joint of the damping medium to the inner and outer components of the composite sleeve should be chemical or mechanical. The joint of inner component of the damping sleeve to the cartridge should be mechanical or chemical. The joint of the sleeve assembly to the bearing housing can be preferably different as it should facilitate both assembly, and disassembly. The bond may be via a heat-activated adhesive, such that the respective parts are squeezed together with the adhesive acting as a lubricant, and is activated by heat once the elements are in place.

The material of the inner and outer sleeves in the exemplary third embodiment of the invention, are made of a durable, low thermal conductivity, chemical resistant, high-temperature resistant, non-metallic, low-friction engineering plastic. However, for increasing rigidity for ease of pressing the composite sleeve assembly into the bearing housing, or for ease of pressing the composite sleeve assembly onto the shaft, the material of one or both of the sleeves can be steel, since the visco-elastic material will provide some thermal insulation of the bearings from the heat flow from the turbine housing through the bearing housing.

In a variation of the third embodiment of the invention, instead of the damping element being a visco-elastic material the damping medium is a liquid of controllable viscosity. The inner and outer sleeves to contain this fluid are as described above, but a flexible seal is applied the axial ends of the aforementioned sleeves to seal in the fluid. The fluid can be similar to that used in viscous dampers as used on internal combustion engines, or the fluid can be a magnetic-rheological fluid as used in vehicle shock absorbers in which the viscosity of the fluid is controlled by the strength of a magnetic field about the magnetic-rheological fluid.

Now that the invention has been described, We claim:

1. A turbocharger including:
a rotating assembly including a shaft (52) and a turbine wheel (51) solidly affixed to one end of the shaft;
a bearing housing including a bearing bore having an internal diameter; and
a rolling element bearing assembly supported in said bearing housing, the rolling element bearing assembly comprising a first bearing and a second bearing, each of the first bearing and second bearing including:
at least one inner race (65, 65C, 65T) and at least one outer race (64), each race provided with at least one raceway, each race having a compressor end face and a turbine end face, the first bearing and second bearing arranged so that the turbine end face of the first bearing faces the compressor end face of the second bearing, and
a series of rolling elements, each rolling element in contact with one of said at least one inner raceway and one of said at least one outer raceway,
the rolling element bearing assembly further comprising an encapsulating sleeve (77) having an inside diameter (79) fit to the outer surface (72) of at least part of the outer circumference of the outer race of each of the first bearing and the second bearing, wherein the encapsulating sleeve (77) is non-metallic, is mechanically or chemically affixed to the radially outer surface (72) of the outer race (64), to the compressor end face of the of the outer race of the first bearing and to the turbine end face of the outer race of the second bearing, provides a thermal barrier for heat flow from the bearing housing to the outer race, and is comprised of a low thermal conductive material that provides a thermal barrier for heat flow from the bearing housing to the outer race, where low thermal conductive material refers to a material having a thermal conductivity that is low relative to the material of the bearing housing.

2. A rolling element bearing as in claim 1, wherein the thermal conductivity of the encapsulating sleeve is from 0.29 to 0.35 J/Kg-° C.

3. A rolling element bearing as in claim 1, wherein the thermal conductivity of the encapsulating sleeve is from 0.22 to 0.5 J/Kg-° C.

4. A turbocharger including:
a rotating assembly including a shaft (52) and a turbine wheel (51) solidly affixed to one end of the shaft;
a bearing housing including a bearing bore having an internal diameter; and
a rolling element bearing assembly supported in said bearing housing, the rolling element bearing assembly comprising a first bearing and a second bearing, each of the first bearing and second bearing including:
at least one inner race (65, 65C, 65T) and at least one outer race (64), each race provided with at least one raceway, each race having a compressor end face and a turbine end face, the first bearing and second bearing arranged so that the turbine end face of the first bearing faces the compressor end face of the second bearing, and
a series of rolling elements, each rolling element in contact with one of said at least one inner raceway and one of said at least one outer raceway, and
the rolling element bearing assembly further comprising an encapsulating sleeve (77) having an inside diameter (79) fit to the outer surface (72) of at least part of the outer circumference of the outer race of each of the first bearing and the second bearing, a portion fit to the compressor end face of the of the outer race of the first bearing and a portion fit to the turbine end face of the outer race of the second bearing,
wherein said encapsulating sleeve is comprised of a material selected from the group consisting of a polyetheretherketone, a polytetrafluoroethylene, a polimide, an acetal, an amorphous thermoplastic polyetherimide, a polyamide-imide, a polybenzamidazole, or a non-metallic composite material exhibiting high-temperature resistance and low thermal conductivity, and is comprised of a low thermal conductive material that provides a thermal barrier for heat flow from the bearing housing to the outer race, where low thermal conductive material refers to a material having a thermal conductivity that is low relative to the material of the bearing housing.

5. A turbocharger including:
a rotating assembly including a shaft (52) and a turbine wheel (51) solidly affixed to one end of the shaft;

a bearing housing including a bearing bore having an internal diameter; and
a rolling element bearing assembly supported in said bearing housing, the rolling element bearing assembly comprising a first bearing and a second bearing, each of the first bearing and second bearing including:
at least one inner race (65, 65C, 65T) and at least one outer race (64), each race provided with at least one raceway, each race having a compressor end face and a turbine end face, the first bearing and second bearing arranged so that the turbine end face of the first bearing faces the compressor end face of the second bearing, and
a series of rolling elements, each rolling element in contact with one of said at least one inner raceway and one of said at least one outer raceway, and
the rolling element bearing assembly further comprising an encapsulating sleeve (77) having an inside diameter (79) fit to the outer surface (72) of at least part of the outer circumference of the outer race of each of the first bearing and the second bearing, a portion fit to the compressor end face of the of the outer race of the first bearing and a portion fit to the turbine end face of the outer race of the second bearing, wherein the thermal conductivity of the encapsulating sleeve is from 0.22 to 0.5 J/Kg-° C., and the encapsulating sleeve is comprised of a low thermal conductive material that provides a thermal barrier for heat flow from the bearing housing to the outer race, where low thermal conductive material refers to a material having a thermal conductivity that is low relative to the material of the bearing housing.

6. A turbocharger including:
a rotating assembly including a shaft (52) and a turbine wheel (51) solidly affixed to one end of the shaft, and
a bearing housing including a bearing bore having an internal diameter,
a rolling element bearing cartridge supported in said bearing housing, the cartridge comprising
  a first bearing and a second bearing, each of the first bearing and second bearing including at least one inner race (65, 65C, 65T) and at least one outer race (64), each race provided with at least one raceway, each race having a compressor end face and a turbine end face, the first bearing and second bearing arranged on the shaft so that the turbine end face of the first bearing faces the compressor end face of the second bearing,
  a series of rolling elements, each rolling element in contact with one of said at least one inner raceway and one of said at least one outer raceway, and
  a non-metallic encapsulating sleeve (77) having an inside diameter (79) fit to the outer surface (72) of the outer race of each of the first bearing and the second bearing, having a portion covering the compressor end face of the of the outer race of the first bearing and having a portion covering the turbine end face of the outer race of the second bearing,
wherein the outside diameter of the encapsulating sleeve (77) is the same as the internal diameter of the bearing bore,
the encapsulating sleeve (77) is comprised of a low thermal conductive material that provides a thermal barrier for heat flow from the bearing housing to the outer race, where low thermal conductive material refers to a material having a thermal conductivity that is low relative to the material of the bearing housing, and
said rotating assembly is supported for rotation by said rolling element bearing cartridge.

7. A turbocharger including:
a rotating assembly including a shaft (52) and a turbine wheel (51) solidly affixed to one end of the shaft;
a bearing housing including a bearing bore having an internal diameter; and
a rolling element bearing cartridge supported in said bearing housing, the cartridge comprising
  a first bearing and a second bearing, each of the first bearing and second bearing including at least one inner race (65, 65C, 65T) and at least one outer race (64), each race provided with at least one raceway, each race having a compressor end face and a turbine end face, the first bearing and second bearing arranged on the shaft so that the turbine end face of the first bearing faces the compressor end face of the second bearing,
  a series of rolling elements, each rolling element in contact with one of said at least one inner raceway and one of said at least one outer raceway, and
  a non-metallic encapsulating sleeve (77) having an inside diameter (79) affixed to the outer surface (72) of the outer race of each of the first bearing and the second bearing, having a portion covering the compressor end face of the of the outer race of the first bearing and having a portion covering the turbine end face of the outer race of the second bearing;
wherein the outside diameter of the encapsulating sleeve (77) is smaller than the internal diameter of the bearing bore;
wherein the encapsulating sleeve (77) is comprised of a low thermal conductive material that provides a thermal barrier for heat flow from the bearing housing to the outer race, where low thermal conductive material refers to a material having a thermal conductivity that is low relative to the material of the bearing housing;
wherein the assembly of the bearing cartridge, including the encapsulating sleeve (77), is supported and damped by an oil film (75) between the encapsulating sleeve (77) and the bearing housing inner bore (71); and
wherein said rotating assembly is supported for rotation by said rolling element bearing cartridge.

8. A turbocharger including:
a rotating assembly including a shaft (52) and a turbine wheel (51) solidly affixed to one end of the shaft;
a bearing housing including a bearing bore having an internal diameter; and
a rolling element bearing cartridge supported in said bearing housing, the cartridge comprising at least one inner race (65, 65C, 65T) and at least one outer race (64), each race provided with at least one raceway, and a series of rolling elements, each rolling element in contact with one of said at least one inner raceway and one of said at least one outer raceway;
wherein the outer race (64) is at least partially encapsulated by a composite sleeve assembly comprising an inner layer, a visco-elastic damping medium (106), and an outer layer, wherein the inner layer has a substantially cylindrical inner diameter (104) which encompasses the outer race (64) of the bearing cartridge,
wherein the outer surface (105) of the inner layer is chemically or mechanically attached to the visco-elastic damping medium (106),
wherein the inner surface (107) of the outer layer is attached to the visco-elastic damping medium (106), and wherein the substantially cylindrical outer surface (108) of the outer layer is attached to a substantially cylindrical inner surface (71) of the bearing housing; and wherein said rotating assembly is supported for rotation by said rolling element bearing.

9. The turbocharger of claim 8, wherein the damping medium is a magnetic-rheological fluid in which the damping capability can be changed by a change in magnetic field.

10. A rolling element bearing assembly, comprising a first bearing and a second bearing, each of the first bearing and second bearing including:
- at least one inner race (65, 65C, 65T) and at least one outer race (64), each race provided with at least one raceway, each race having a compressor end face and a turbine end face, the first bearing and second bearing arranged so that the turbine end face of the first bearing faces the compressor end face of the second bearing, and
- a series of rolling elements, each rolling element in contact with one of said at least one inner raceway and one of said at least one outer raceway,
- the rolling element bearing assembly further comprising an encapsulating sleeve (77) having an inside diameter (79) fit to the outer surface (72) of at least part of the outer circumference of the outer race of each of the first bearing and the second bearing, wherein the encapsulating sleeve is a composite sleeve assembly comprising
- an inner layer,
- a visco-elastic damping medium (106), and
- an outer layer, wherein
- the inner layer has a substantially cylindrical inner diameter (104) which encompasses the outer race (64) of the bearing cartridge,
- the outer surface (105) of the inner layer is chemically or mechanically attached to the visco-elastic damping medium (106), and
- the inner surface (107) of the outer layer is attached to the visco-elastic damping medium (106).

* * * * *